United States Patent [19]

Kulhanek

[11] 4,287,787

[45] Sep. 8, 1981

[54] APPARATUS FOR MOVING A MEMBER

[75] Inventor: James A. Kulhanek, Perry, Ohio

[73] Assignee: Towmotor Corporation, Mentor, Ohio

[21] Appl. No.: 92,808

[22] Filed: Nov. 9, 1979

[51] Int. Cl.³ .......................... B62D 1/18; F16H 25/20
[52] U.S. Cl. ..................................... 74/493; 74/89.15
[58] Field of Search ................ 74/493, 89.15; 49/343; 251/228

[56] References Cited

U.S. PATENT DOCUMENTS

| | | | |
|---|---|---|---|
| 1,402,535 | 1/1922 | Page | 74/493 |
| 1,559,891 | 11/1925 | Landine | 49/343 X |
| 2,311,195 | 2/1943 | Young | 49/343 |
| 2,464,856 | 3/1949 | Finley | 74/493 |
| 3,043,160 | 7/1962 | Killian | 74/89.15 X |
| 3,279,277 | 10/1966 | Stevens et al. | 74/493 |
| 3,424,473 | 1/1969 | Morgan | 74/493 X |
| 3,504,569 | 4/1970 | Zoltok | 74/493 |
| 3,555,924 | 1/1971 | Scheffler, Jr. | 74/493 |
| 3,737,003 | 6/1973 | Beals et al. | 74/493 X |
| 3,799,569 | 3/1974 | Baker | 74/493 X |
| 3,807,252 | 4/1974 | Parr | 74/493 |
| 3,955,439 | 5/1976 | Meyer | 74/493 |
| 3,978,740 | 9/1976 | Selzer | 74/493 |
| 3,991,633 | 11/1976 | Molnar et al. | 74/493 |
| 4,120,483 | 10/1978 | Leroch | 251/228 X |

FOREIGN PATENT DOCUMENTS 17635 8/1898 United Kingdom .................. 49/343

Primary Examiner—Allan D. Herrmann
Attorney, Agent, or Firm—Phillips, Moore, Weissenberger, Lempio & Majestic

[57] ABSTRACT

An assembly (32) for adjusting a steering wheel (30), supported on a steering column (36), in relation to an operative position of the wheel (30), includes a hinge (34) supporting the column (36), a fixed bracket (44) pivotally supporting the hinge (34) and having a seat (58) on which the hinge (34) sits in the operative position, and an actuating mechanism (62) being rotatably coupled through the hinge (34) and bracket (44) to move the hinge (34) off of and onto the seat (58). The assembly (32) can be used in a forklift truck (10) and is directed to provide, for example, for moving the wheel (30) through infinite, rather than discrete positions, and to prevent impact forces from being imparted to the actuating mechanism (62) in response to positioning the wheel (30).

5 Claims, 5 Drawing Figures

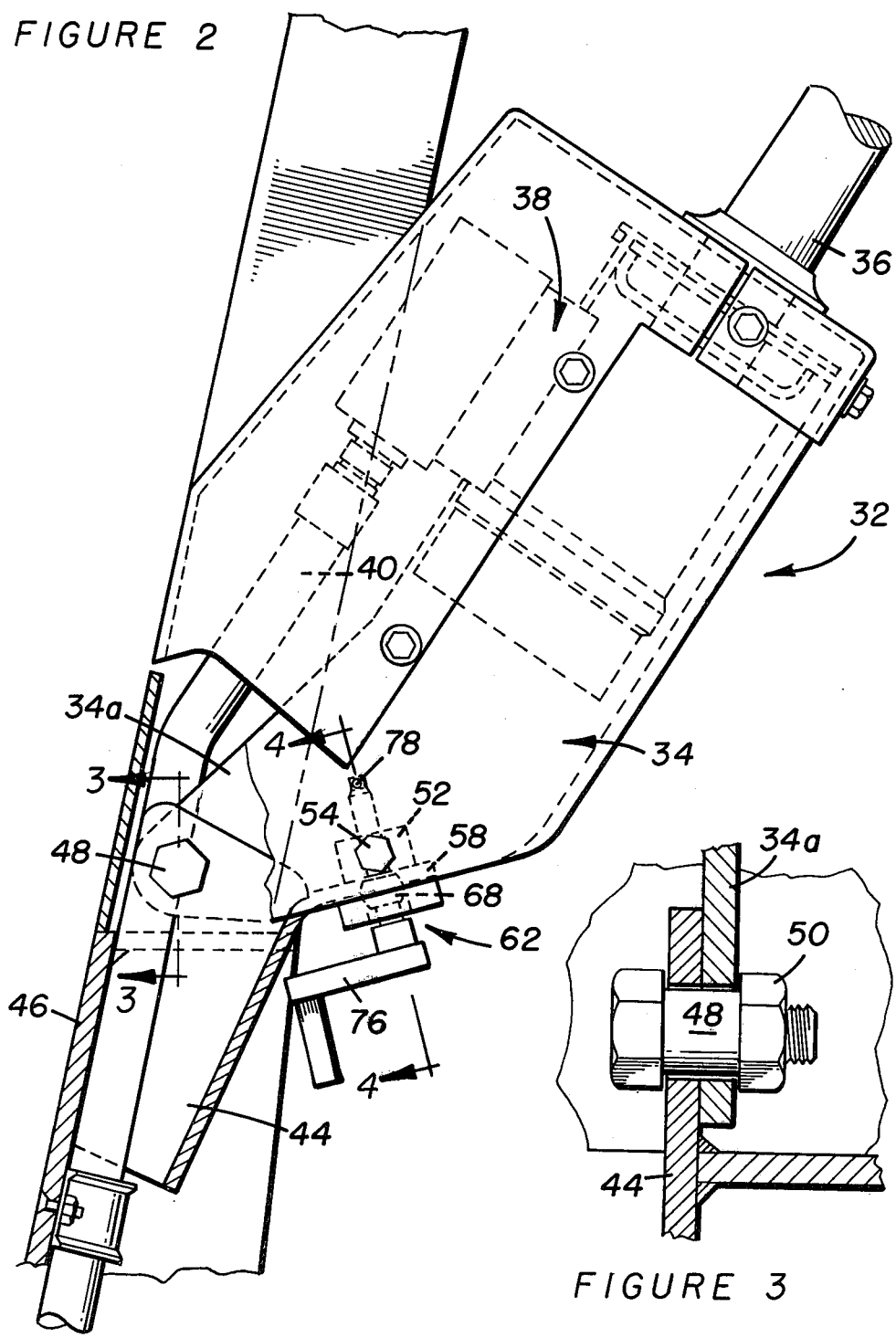

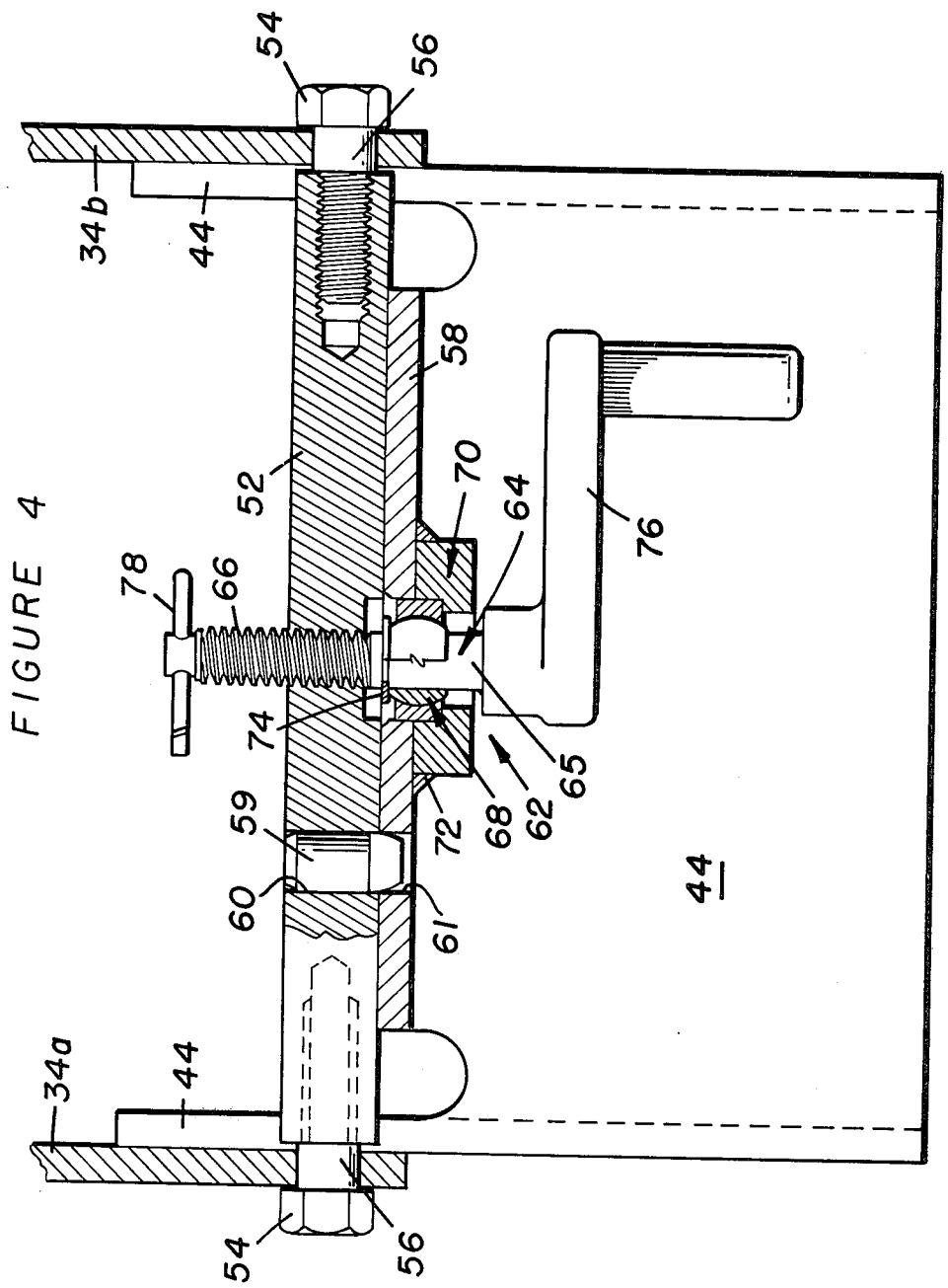

APPARATUS FOR MOVING A MEMBER

TECHNICAL FIELD

This invention relates to apparatus for moving a member and, more particularly, to an assembly for adjusting a steering wheel of a vehicle.

BACKGROUND ART

In recent years, various types of vehicles have been manufactured with adjustable steering wheels. These wheels have been made adjustable primarily to accommodate the vehicle operator. More particularly, since the size of the operator of the vehicle will vary from one operator to the other, the steering wheel has been made adjustable to place it in a position of maximum comfort and ease of manipulation for the operator.

Typically, the steering wheel is mounted on a steering column that is pivotally connected to a support. A locking mechanism will lock the steering column and, hence, the steering wheel in one of a plurality of discrete positions. The operator can adjust the steering wheel by unlocking the locking mechanism, and then manually moving the steering wheel to pivot the steering column to a new position, in which the locking mechanism is again locked.

One disadvantage with the prior adjustable steering wheels is that the locking mechanism is usually easily released or unlocked by the manipulation of an accessible lever or pin. Since such a lever and such a pin are easily accessible by the operator, it is possible, during the operation of the vehicle, for the operator's legs or arms to inadvertently unlock the lock. Consequently, during movement of the vehicle while it is being steered, the steering wheel can be unintentionally moved to a position which does not provide maximum comfort or ease of manipulation for the operator.

Furthermore, in all positions of the steering wheel, the steering column will impart a load substantially on the pivot. This load will cause fatigue and will shorten the life of the pivot. Still further, during movement of the steering wheel, from one position to the other, the steering column and locking mechanism are separated. Large forces are exerted during this free moving state of the steering wheel and these will undesirably be imparted as impact to the locking mechanism upon connection in the new position of the steering wheel.

Moreover, since the adjustable steering wheels are designed for the primary purpose of operator comfort, relatively little thought has been given to the design of adjustable steering wheels for other purposes which will be described below. Thus, for example, a maximum range of adjustability is usually designed into the steering wheel and the associated mechanisms to accommodate operators of all sizes. This maximum range is typically coextensive with the range of movement of the supporting steering column to which, for example, high pressure, flexible, fluid hoses and steering valves are connected for power steering of the vehicle. A problem therefore exists in that the corresponding flexing of the hoses as the steering column moves will cause fatigue which will shorten the life of these hoses. Also, the steering wheel is movable only to finite or discrete positions, thereby limiting the positioning of the wheel.

DISCLOSURE OF THE INVENTION

The present invention is directed to overcoming one or more of the problems as set forth above.

In one aspect of the present invention, an assembly is utilized for adjusting a steering wheel in relation to an operative position of the wheel, the wheel being supported on a steering column, including movable means for supporting the steering column, fixed means for pivotally supporting the movable means, the fixed means including a seat, the movable means being on the seat in the operative position of the wheel, and means for actuating the movable means to move off the seat and pivot about the fixed means.

With prior art apparatus, for example, it is relatively easy to inadvertently move a steering wheel from one discrete position to spaced apart other discrete positions, as well as to impart large forces as impact on the lock mechanism for the wheel. Also, with prior devices the load will be substantially carried by the pivot. With the present invention, inadvertent movement of the actuating means will result in only very slight movement of the steering wheel, and the above-mentioned impact will not occur during positioning of the wheel. Furthermore, the load will be shared between a pivot for the first supporting means and the actuating means.

BRIEF DESCRIPTION OF THE DRAWINGS

FIG. 2 is a side elevation, partly in section, of an embodiment of the present invention for moving the steering wheel;

FIG. 3 is a view taken along lines 3—3 of FIG. 2;

FIG. 4 is a view taken along lines 4—4 of FIG. 2; and

BEST MODE OF CARRYING OUT THE INVENTION

Figure 1:
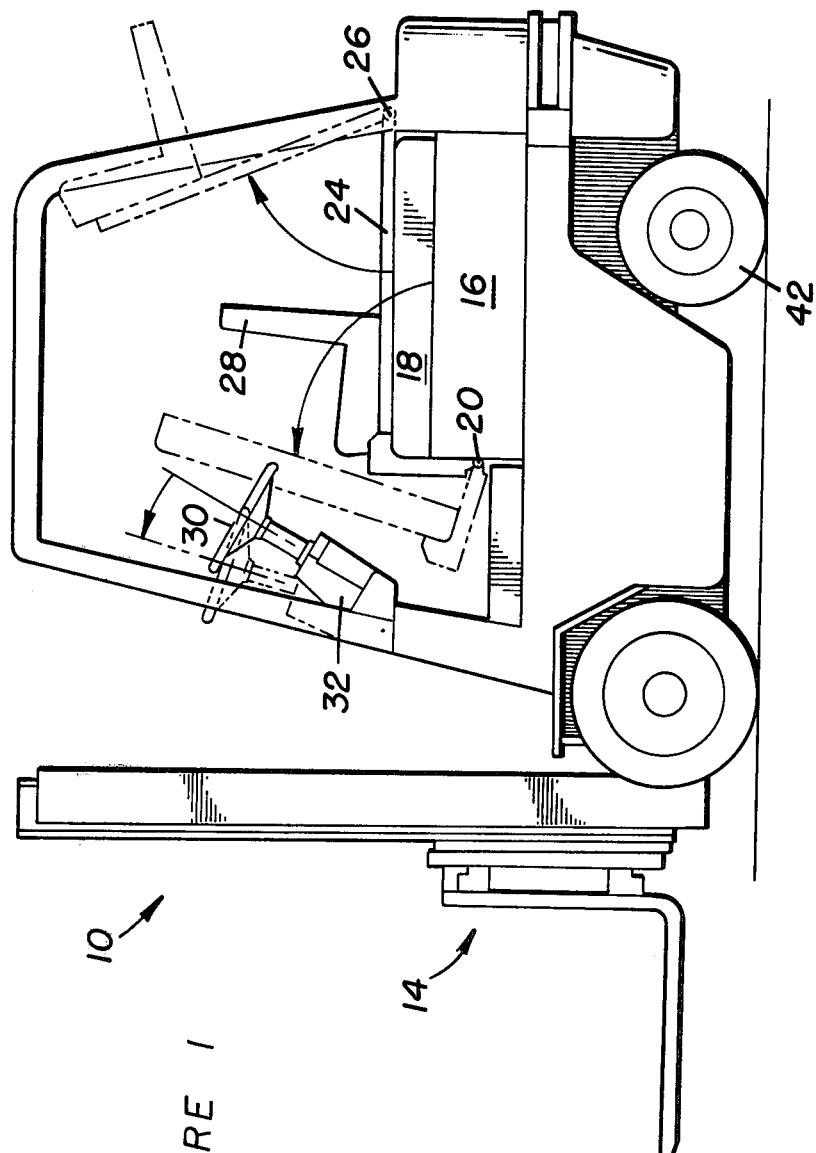
FIG. 1 is a side elevation of a vehicle having an adjustable steering wheel.

FIG. 1 illustrates generally a vehicle 10 which is, for example, a forklift truck having a mast and forklift carriage assembly 14 at its front end to load and unload articles. The truck 10 has a compartment 16 in which a source of motive power is located, for example, a battery (not shown) for supplying electric power to operate various conventional components of the truck 10. A cover 18, which covers the compartment 16, is pivotally connected at 20 to the compartment 16 for access to the interior of this compartment 16 when required. The cover 18 can be manually pivoted from the solid line position towards the dotted line position shown in FIG. 1.

A platform 24, which sits on top of the cover 18, is connected to the truck 10 by a pivot 26. An operator's seat 28 is connected to the platform 24 to move with the platform 24. The seat 28 and platform 24 are movable from the solid line position shown in FIG. 1 corresponding to the operative position on the truck 12, to the dotted line position shown in FIG. 1. As is apparent, access to the interior of the compartment 16 is had by first pivoting the platform 24 to the dotted line position and then pivoting the cover 18 to the dotted line position.

The truck 10 has an adjustable steering wheel 30 that is movable from the solid line position shown in FIG. 1 to the dotted line position. The steering wheel 30 is adjustable to allow for adequate clearance of the cover 18 to pivot to its dotted line position shown in FIG. 1 for maximum access to the interior of the compartment 16. As can be seen in FIG. 1, with the steering wheel 30 in its solid line position, the cover 18 will be prevented by the steering wheel 30 from moving to its dotted line position for sufficient access to the interior of the compartment 16.

A mechanism 32, shown generally in FIG. 1, is used to adjust or move the steering wheel 30 to the dotted line position. As illustrated in FIG. 2, the mechanism 32 includes a movable member or hinge 34, having sides 34a, 34b, (see also FIGS. 3-4), which supports a steering column 36 that extends into the interior of the hinge 34. Generally shown in FIG. 2 is a power steering valve 38 that is also supported by the hinge 34. The valve 38, in a conventional manner, responds to movement of the steering column 36 to control the flow of hydraulic fluid through a flexible hose 40 for controlling the ground steerable wheels 42 (see FIG. 1) of the truck 10.

A fixed member or bracket 44 is connected to a front wall or frame portion 46 of the truck 10. The movable hinge 34 is pivoted at the one side 34a to the fixed bracket 44 with a bolt or pin 48 that extends through the hinge 34 and bracket 44 and also acts as a bearing. A nut 50 is threaded onto a threaded end of the bolt 48 to maintain the pivot connected as shown. A similar bolt 48 and nut 50 (not shown) are on the opposite side of the hinge 34 and bracket 44 from that shown in FIG. 3. Consequently, the hinge 34 can pivot about the bolt 48 in relation to the fixed bracket 44.

As illustrated in FIGS. 2 and 4, the hinge 34 has a cross bar 52 that extends between the sides 34a and 34b of the hinge 34. A pair of threaded bolts or pins 54 extend through the sides 34a, 34b of the hinge 34 and into the bar 52 threadably engage the bar 52 as shown. The bolts 54 have smooth outer portions 56 which extend through the sides 34a, 34b of the hinge 34 to act as pivots and bearing surfaces. Thus, the bar 52 can pivot about portions 56 in relation to the hinge 34.

The fixed bracket 44 has a seat or stop 58 which is substantially coextensive with the bar 52. In the position shown in FIG. 4, the bar 52 is supported on the stop 58. A dowel pin 59 is press fitted into an aperture 60 in the bar 52 and slip fitted in an aperture 61 in the stop 58 to prevent relative lateral movement between the bar 52 and stop 58. This is the normal operating position of the steering wheel 30.

An actuating mechanism 62 is used to move the bar 52 onto and off the stop 58 and, hence, pivot the hinge 34 about the fixed bracket 44. The mechanism 62 includes a rotatable shaft 64 having a smooth outer surface portion 65 and a threaded portion 66 that rotatably extends through the stop 58 and bar 52, respectively. The threaded portion 66 engages corresponding threads in the bar 52. A spherical bearing assembly 68 surrounds the smooth portion 65 and is disposed within a retainer block 70 welded to the stop 58 by welds 72. A snap ring 74 retains the bearing assembly 68 in position from axial movement. A rotatable crank 76 is connected to one end of the smooth portion 65 to rotate the shaft 64. The rotation of the crank 76 will result in the bar 52 moving axially along the threaded portion 66 and pivoting via bolts 54 in relation to sides 34a and 34b, as will be further described. A pin 78 is connected through the top of the threaded portion 66 of the shaft 64 to stop this axial movement of the bar 52 at maximum separation between the cross bar 52 and stop 58.

INDUSTRIAL APPLICABILITY

When access to the interior of the compartment 16 is needed, the crank 76 will be rotated to move axially the bar 52 along the threaded portion of the shaft 64. This will cause the movable hinge 34 to pivot about the bearing 48 of the fixed bracket 44. Thus, the steering column 36 and steering wheel 30 will move to the dotted line position shown in FIG. 1.

Figure 5:
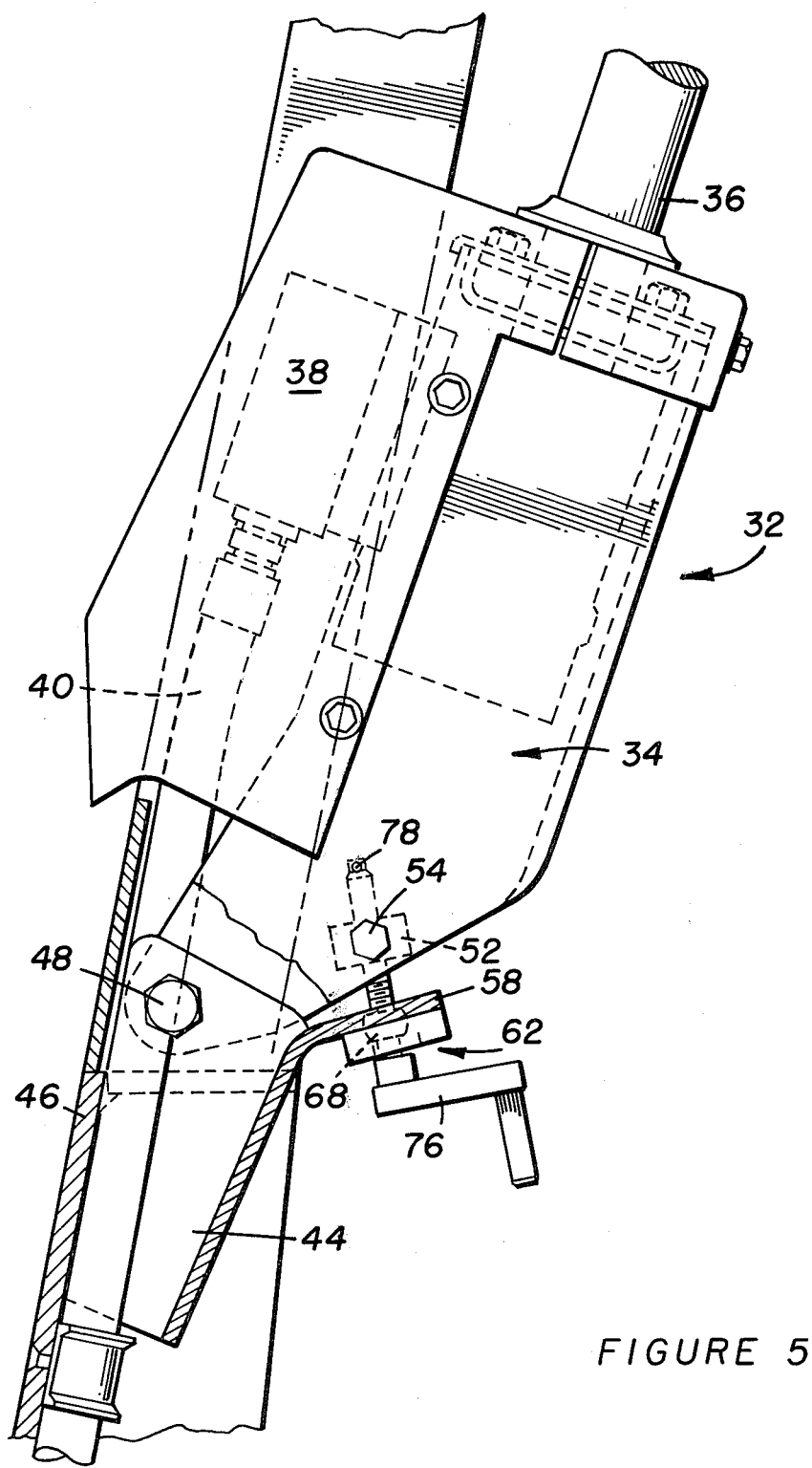
FIG. 5 is a view similar to FIG. 2 and showing the embodiment of FIG. 2 in another position.

The final position of the movable hinge 34 is shown in FIG. 5. In such a position the bar 52 will be spaced apart from the seat or stop 58. As the hinge 34 is pivoted, the bar 52 will rotate about its longitudinal axis, defined by the bolts 54, in relation to the sides 34a, 34b. The spherical bearing 68 will also allow the entire actuating mechanism 62 to pivot with the bar 52 so that the shaft 64 will not bend, whereby no stresses are introduced into the mechanism 62 as the pivoting occurs. In other words, alignment is maintained between the threads on shaft portion 66 and on cross-bar 52, so that there is a right angle relationship maintained between shaft 64 and bar 52 for smooth operation and for directing forces along the axis of shaft 64.

After access is had to the interior of the compartment 16, the crank 76 can be rotated in the opposite direction to once again position the bar 52 on the stop 58.

The present invention has a number of other advantages which will now be discussed. The steering wheel 30, when in the solid line position shown in FIG. 1, is in the operative position of the steering wheel. In this position, as already noted, the bar 52 is supported on the seat or stop 58. Consequently, the load provided by the steering wheel 30, the hinge 34 and the steering column 36 is carried substantially by the fixed bracket 44, though the pivot pins 48 share some of the load. Specifically, load support is accomplished through a triangular structure between pin 54, bearing assembly 68 and pin 48. In prior adjustable steering mechanisms, in all the adjustable positions, the load usually is carried substantially by pivot pins which can result in premature failure of them.

By means of the rotation produced with the shaft 64 and crank 76, the steering wheel 30 can be moved to an infinite number of continuous positions corresponding to the position of the bar 52 between the stop 58 and the pin 78. Therefore, any inadvertent slight movement of the crank 76 will produce only a very slight change in position of the steering wheel 30.

Also, the actuating mechanism 62 is always connected to the hinge 34 and bracket 44. Therefore there is no impact loading due to the forces being generated when moving the steering wheel 30 through the various positions.

As can be appreciated from the drawings, the steering wheel 30 is far removed from the pivots 48. Consequently, only a small pivoting of the hinge 34 will produce a large movement of the wheel 30. With the flexible hose 40 coupled within the hinge 34, there also will be only slight movement of this hose 40. Thus, the steering wheel 30 can be moved to gain access to the interior of the compartment 16 without substantially flexing the hose 40. This will reduce the fatigue of the hose 40 and prolong its life.

Other aspects, objects and advantages of this invention can be obtained from a study of the drawings, the disclosure and the appended claims.

I claim:

1. An assembly (32) for adjusting a steering wheel (30) in relation to an operative position of the wheel (30), the wheel (30) being supported on a steering column (36), comprising:
   (a) movable means (34, 52, 54) for supporting the steering column (36);
   (b) fixed means (44, 48, 58) for pivotally supporting said movable means (34, 52, 54), said fixed means (44, 48, 58) including a seat (58), said movable means (34, 52, 54) being on said seat (58) in the operative position of the wheel (30); and
   (c) means (62) for actuating said movable means (34, 52, 54) to move off said seat (58) and pivot about said fixed means (44, 48, 58).

2. An assembly (32) according to claim 1, wherein said movable means (34, 52, 54) includes a hinge (34) having one end, said fixed means (44, 48, 58) pivotally supporting said hinge (34) at said one end.

3. An assembly (32) according to claim 1, wherein said means (62) for actuating includes means (64, 68, 76) for moving said movable means (34, 52, 54) off of and onto said seat (58), and being coupled to said movable means (34, 52, 54) and said fixed means (44, 48, 58).

4. An assembly (32) according to claim 3, wherein said means (64, 68, 76) for moving includes:
   (a) a shaft (64) extending through said seat (58) and being threadably engaged with said movable means (34, 52, 54); and
   (b) a crank (76) being connected to said shaft (64).

5. An assembly (32) according to claim 3, wherein said means (64, 68, 76) for moving includes means (68) for controlling stress of said moving means (64, 68, 76) in response to pivoting of said movable means (34, 52, 58).

* * * * *